(12) United States Patent
Meves

(10) Patent No.: US 10,084,808 B2
(45) Date of Patent: Sep. 25, 2018

(54) SELECTIVE EXTENDED ARCHIVING OF DATA

(71) Applicant: THE BOEING COMPANY, Huntington Beach, CA (US)

(72) Inventor: Nicholas J. Meves, Bellevue, WA (US)

(73) Assignee: The Boeing Company, Huntington Beach, CA (US)

( * ) Notice: Subject to any disclaimer, the term of this patent is extended or adjusted under 35 U.S.C. 154(b) by 208 days.

(21) Appl. No.: 15/069,762

(22) Filed: Mar. 14, 2016

(65) Prior Publication Data

US 2017/0264630 A1    Sep. 14, 2017

(51) Int. Cl.
  *G06F 21/50*   (2013.01)
  *H04L 29/06*   (2006.01)
  *G06F 11/14*   (2006.01)

(52) U.S. Cl.
  CPC ...... *H04L 63/1433* (2013.01); *G06F 11/1458* (2013.01); *G06F 21/50* (2013.01); *H04L 63/14* (2013.01); *H04L 63/1425* (2013.01); *G06F 2201/80* (2013.01)

(58) Field of Classification Search
  CPC ............................. H04L 63/1425; G06F 21/50
  See application file for complete search history.

(56) References Cited

U.S. PATENT DOCUMENTS

| 8,365,241 | B1 | 1/2013 | Gunda |
| 8,938,430 | B2 | 1/2015 | Agrawal et al. |
| 2005/0044406 | A1* | 2/2005 | Stute ............ C12Q 1/6804 726/4 |
| 2006/0265748 | A1* | 11/2006 | Potok ............ G06F 21/552 726/23 |
| 2014/0344234 | A1* | 11/2014 | Amarendran ..... G06F 17/30289 707/694 |
| 2016/0246849 | A1* | 8/2016 | Frampton ........ G06F 17/30528 |
| 2017/0214718 | A1* | 7/2017 | Couterier ............ H04L 63/205 |

FOREIGN PATENT DOCUMENTS

WO    2005/066604    7/2005

OTHER PUBLICATIONS

Extended European Search Report dated Jul. 18, 2017 in European Application No. 17153082.7.

* cited by examiner

*Primary Examiner* — Farid Homayounmehr
*Assistant Examiner* — Zhimei Zhu
(74) *Attorney, Agent, or Firm* — Womble Bond Dickinson (US) LLP

(57) ABSTRACT

A system is provided for selective extended archiving of data. A network analyzer may intercept and log traffic that passes over at least part of a computer network including capturing a plurality of network packets and producing a traffic log including a corresponding plurality of entries with values of fields in the plurality of network packets. A data collector may receive the traffic log and archive the corresponding plurality of entries for a predetermined retention period, and produce a table of the values of the fields. An data collector may then identify a value from the table as an indicator of a network compromise, and cause the data collector to archive entries of the corresponding plurality of entries having the value for an additional period beyond the predetermined retention period.

12 Claims, 4 Drawing Sheets

SELECTIVE EXTENDED ARCHIVING OF DATA

TECHNOLOGICAL FIELD

The present disclosure relates generally to data archiving and, in particular, to selective extended archiving of data for improving assessments of network security compromises.

BACKGROUND

The volume of Internet traffic generated by large business corporations requires considerable computing resources to monitor and detect known security threats, in addition to detecting new and less apparent security threats. In security, reports of malicious activity from the past are frequently received but modern archiving conventions do not support a substantial backlog of data for confirming whether or not a company was previously affected by the identified threat. In particular, storing data for a lengthy period of time (e.g., longer than a few weeks for packet capture data, or 3 months for system log) is very costly.

Current solutions attempt to address these issues by stripping context from the log to reduce its data size. However, the current methods only allow for reducing the size of the archived log to about 25-50% of its original size which may still require considerable resources for long-term storage. Therefore, it may be desirable to have a system and method that addresses at least some of these issues, and improves upon existing practices.

BRIEF SUMMARY

Example implementations of the present disclosure are directed to an improved system, method and computer-readable storage medium for selective extended archiving of data. In particular, as opposed to costly archiving large amounts of data or reducing archived data by stripping the content thereof, the system provides a means for selectively archiving data for an extended period of time and thereby reducing the volume of data that is subsequently analyzed in detail to allow for detection of immediate threats and patterns of occurrence and/or recurrence within network traffic that may be spread over many months. As such, the system reduces the cost of long-term archival of potentially valuable data. The present disclosure includes, without limitation, the following example implementations.

In some example implementations, a method is provided for selective extended archiving of data. The method may comprise intercepting and logging traffic that passes over at least part of a computer network. Intercepting and logging traffic may include capturing a plurality of network packets and producing a traffic log including a corresponding plurality of entries with values of fields in the plurality of network packets. The method may also comprise receiving the traffic log and archiving the corresponding plurality of entries for a predetermined retention period, and producing a table of the values of the fields. The method may also comprise identifying a value from the table as an indicator of a network compromise, and archiving entries of the corresponding plurality of entries having the value for an additional period beyond the predetermined retention period.

In some example implementations of the method of the preceding or any subsequent example implementation, or any combination thereof, producing the traffic log includes producing the traffic log including the corresponding plurality of entries with values of fields including at least one of an Internet Protocol (IP) address, domain name, email address, user agent, or hash function field.

In some example implementations of the method of any preceding or any subsequent example implementation, or any combination thereof, the traffic log includes a plurality of traffic logs produced over successive time frames, and producing the table includes iteratively updating the table to include the values of the fields of the corresponding plurality of entries as the plurality of traffic logs are produced.

In some example implementations of the method of any preceding or any subsequent example implementation, or any combination thereof, producing the table includes producing the table including a record for each value of the values of the fields, the record including at least one of a time at or date on which the network analyzer first or most recently included an entry with the value in the traffic log, or a number of entries with the value in the traffic log.

In some example implementations of the method of any preceding or any subsequent example implementation, or any combination thereof, identifying the value includes being identifying the value as a first or irregular instance of the value in the table.

In some example implementations of the method of any preceding or any subsequent example implementation, or any combination thereof, identifying the value as the first or irregular instance of the value includes identifying the value based on an iterative comparison of values in the table.

In some example implementations of the method of any preceding or any subsequent example implementation, or any combination thereof, the method further comprises searching the corresponding plurality of archived entries, and from the search, retrieving any entry of the corresponding plurality of archived entries having a value associated with an identified network compromise.

In some example implementations, an apparatus is provided for selective extended archiving of data. The apparatus comprises a processor and a memory storing executable instructions that, in response to execution by the processor, cause the apparatus to implement a number of subsystems, such as a network analyzer, data collector, analysis engine, and intrusion detector which may be configured to at least perform the method of any preceding example implementation, or any combination thereof.

In some example implementations, a computer-readable storage medium is provided for selective extended archiving of data. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
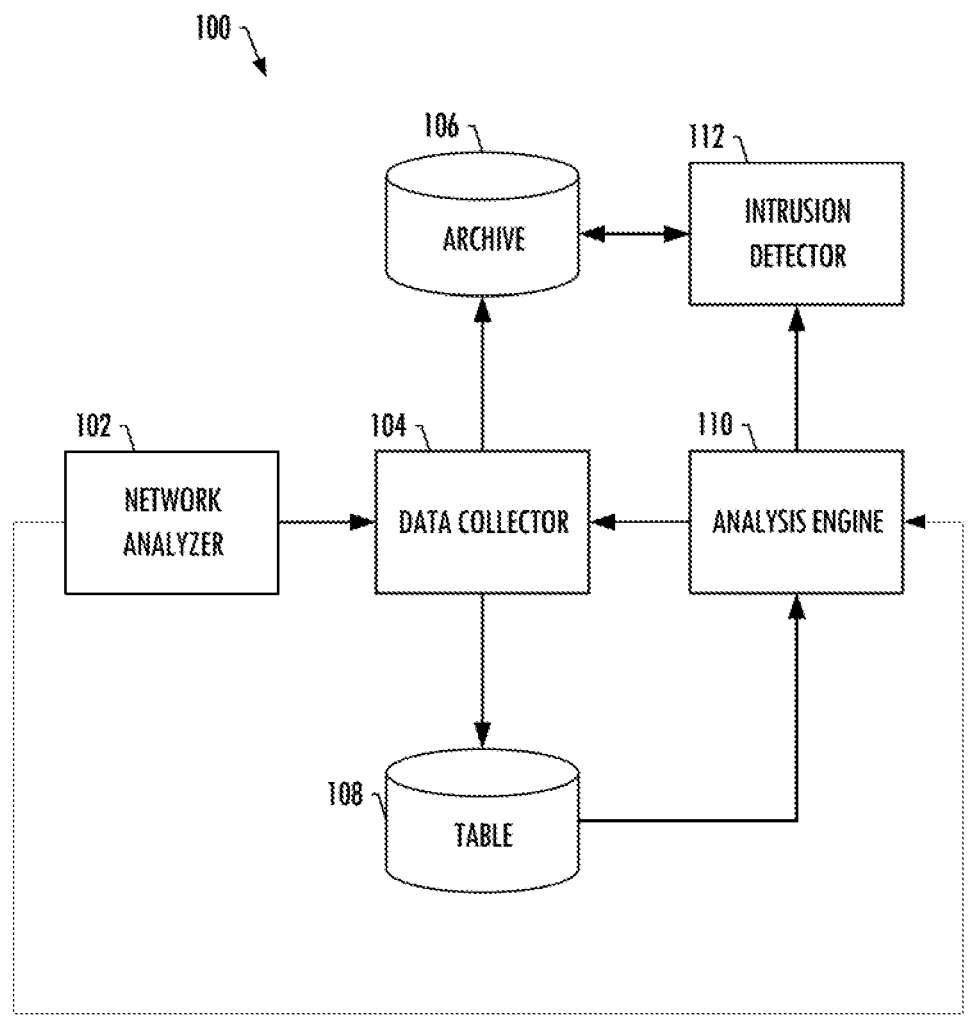
FIG. 1 is an illustration of a system for selective extended archiving of data, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to data archiving and, in particular, to selective extended archiving of data for improving assessments of network security compromises. Example implementations will be primarily described in conjunction with data networking, archiving and security applications. It should be understood, however, that example embodiments may be utilized in conjunction with a variety of other applications such as error logging and performance monitoring during application development, testing, and production including providing information for debugging development applications and/or for performing root cause corrective actions on production systems.

Figure 2:
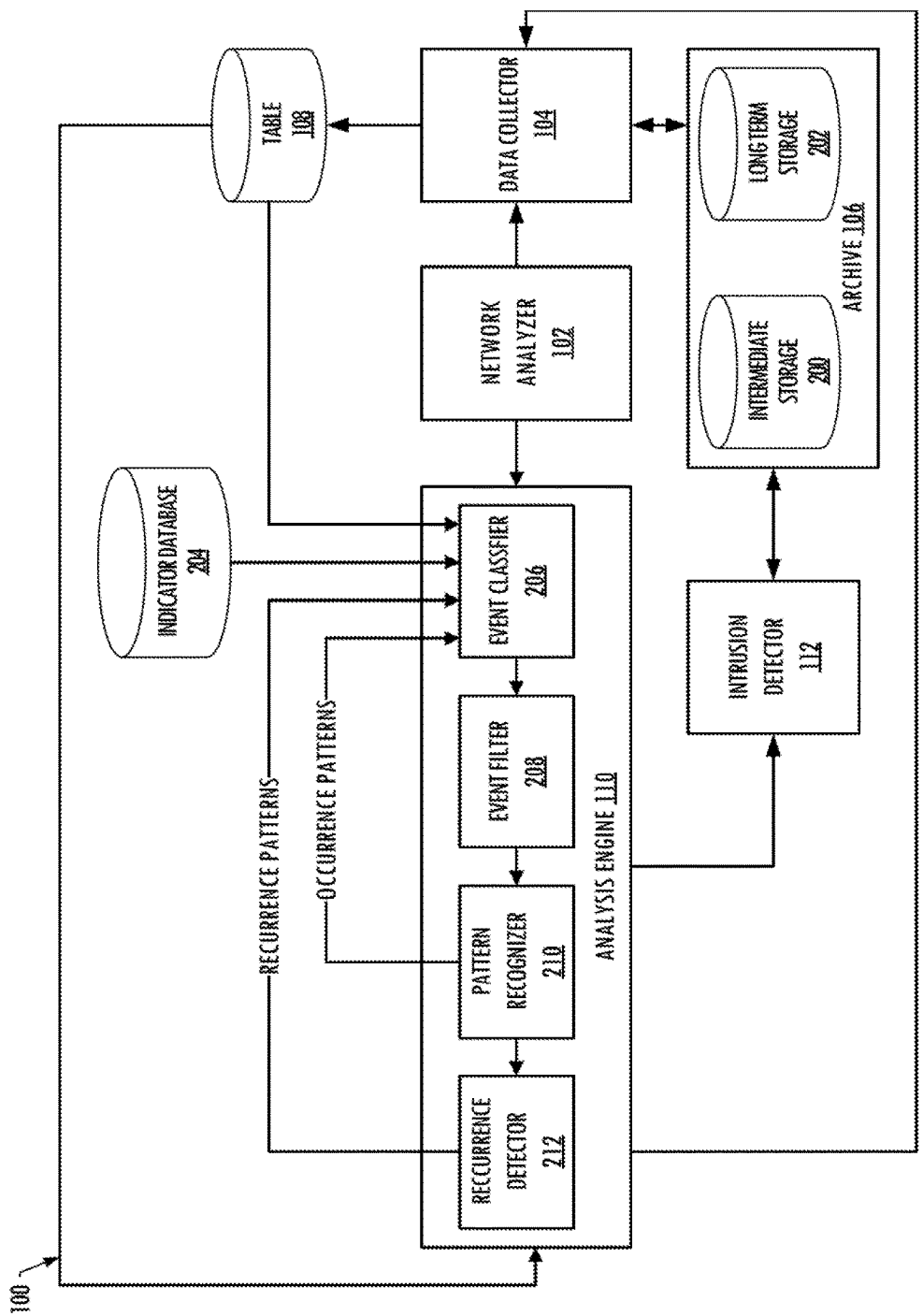
FIG. 2 illustrates a more particular example of the system of FIG. 1, according to example implementations of the present disclosure.

FIG. 1 illustrates a system 100 for selective extended archiving of data according to example implementations of the present disclosure, which may be simply referred to as the "system" herein. FIG. 2 illustrates a more particular example of the system 100 for selective extended archiving of data according to example implementations of the present disclosure. The system may be configured to perform a number of different functions or operations, either automatically, under direct operator control, or some combination of thereof. In this regard, the system may be configured to perform one or more of its functions or operations automatically, that is, without being directly controlled by an operator. Additionally or alternatively, the system may be configured to perform one or more of its functions or operations under direct operator control.

The system 100 may be generally configured to analyze network events based on event statistics or parameters, occurrence and/or recurrence patterns, and conventional indicators to create a log containing only events that are recognized as potential threats. For example, the log may be analyzed to identify patterns of occurrence, and maintained over a substantial period of time and analyzed to identify patterns of recurrence. The system also provides a means to recognize and detect patterns of occurrence and recurrence within network traffic that would not be easily detectable in larger volumes of data.

Accordingly, the system 100 may reduce the computing time and storage space required to monitor network traffic events by only implementing long-term storage for events that are recognized as potential threats. Using this system and method, typical network traffic may be identified and long-term storage or data archiving may only be required for 2-5% of the data which may be archived for a lengthy period of time (e.g., years) at a much lower cost. Additionally, the context of the archived logs may be available for an adequate period of time after the malicious event. In particular, the system may log and store suspicious events for a period of time (e.g., a few days) after the event is initially detected in which a few days of logging may be adequate enough to capture substantial data about the malicious activity after original inception.

The system 100 may include one or more of each of a number of different subsystems (each an individual system) coupled to one another for performing one or more functions or operations. As shown in FIG. 1, for example, the system may include a network analyzer 102, data collector 104, archive 106, table 108, analysis engine 110 and/or intrusion detector 112 that may be coupled to one another. Although shown as part of the system, one or more of the network analyzer, data collector, archive, table, analysis engine or intrusion detector may instead be separate from but in communication with the system. It should also be understood that one or more of the subsystems may function or operate as a separate system without regard to others of the subsystems. And further, it should be understood that the system may include one or more additional or alternative subsystems than those shown in FIG. 1.

As explained in greater detail below, the network analyzer 102 may be generally configured to intercept and log traffic that passes over at least part of a computer network including capturing a plurality of network packets and producing a traffic log. The traffic log may include a corresponding plurality of entries with values of fields in the plurality of network packets. The data collector 104 may be generally configured to receive the traffic log and archive (in archive 106) the corresponding plurality of entries for a predetermined retention period, and produce a table 108 of the values of the fields. The analysis engine 110 may be coupled to the data collector and generally configured to identify a value from the table as an indicator of a network compromise, and cause the data collector to archive entries of the corresponding plurality of entries having the value for an additional period beyond the predetermined retention period.

As indicated above, the network analyzer 102 may be configured to intercept and log traffic that passes over at least part of a computer network. In some examples, the network analyzer may be or include one or more network monitors configured to provide a source of network traffic and/or network event records. Intercepting and logging traffic may include capturing a plurality of network packets and producing a traffic log including a corresponding plurality of entries with values of fields in the plurality of network packets. In some examples, the values of the fields may include at least one of an Internet Protocol (IP) address, domain name, email address, user agent, hash function field, or the like. In some implementations, the values of the fields may include any types of data that may be frequently reported as indicators of compromise by a malicious attacker.

The data collector 104 may be configured to receive the traffic log and archive the corresponding plurality of entries for a predetermined retention period. The data collector may be operatively coupled to the network analyzer 102 for receiving the traffic log. The archive 106 or database for storing the plurality of entries may include one or more entries having differing retention periods. As shown in FIG. 2, in some examples, the archive may include both a short-term or intermediate 200 and long-term 202 storage capacity.

The data collector 104 may also produce a table 108 of the values of the fields. In some implementations, the table may be or include a database for storing the values of the fields in which the database may be operatively coupled to the data collector and the analysis engine 110. In these examples, producing the table may include tabulating and/or indexing the values of the fields and storing the values within the table database for subsequent analysis. In some examples, the traffic log may include a plurality of traffic logs produced over successive time frames, and the data collector may be configured to iteratively update the table to include the values of the fields of the corresponding plurality of entries as the plurality of traffic logs are produced.

In some example implementations, for each value of the values of the fields, the data collector 104 may be configured to produce a record within the table 108 including at least one of a time at or date on which the network analyzer 102 first or most recently included an entry with the value in the traffic log, or a number of entries with the value in the traffic log. As such, the table may include only a single record for each unique value of the values in the field.

The analysis engine 110 may be configured to identify a value from the table 108 as an indicator of a network compromise, and cause the data collector 104 to archive entries of the corresponding plurality of entries having the value for an additional period beyond the predetermined retention period. As shown in FIG. 2, for example, the corresponding plurality of entries may be archived within the long-term storage 202.

In some examples, the analysis engine 110 may be configured to identify a value as an indicator of a network compromise as a result of identifying the value as a first or irregular instance of the value in the table 108, such as based on an iterative comparison to the values in the table. In some examples, the analysis engine may be configured to identify a value as an indicator of a network compromise based at least in part on an external source.

As shown in FIG. 2, for example, the analysis engine 110 may be operatively coupled to an indicator database 204 that may be configured to receive and store values externally identified as known indicators of a network compromise. The identified values may be obtained from at least one of a subject matter expert or industry source. For example, industry sources may communicate indicators based on compromises observed within their internal networks. In some implementations, examples of suitable sources may be or include a plurality of government agencies (e.g., agencies with requirements to report government networking breaches) including the Federal Bureau of Investigation (FBI), National Security Agency (NSA) Department of Homeland Security (DHS); other intelligence sources that provide access to their research and indicators including Crowdstrike, Fireeye, Palo Alto, iDefense; or open source research (e.g., information obtained via blogging sites, independent security researchers, and the like). In these examples, the analysis engine may include an event classifier 206 configured to identify a value as an indicator of a network compromise as a result of identifying the value within the indicator database.

In some examples, a network event may be defined by one or more entries within the traffic log, and as shown in FIG. 2, the event classifier 206 may also be configured to receive statistics of the network traffic as provided by the table 108 or directly receive the traffic logs from the network analyzer 102 for classifying the corresponding plurality of entries as potentially compromising or non-compromising network events. In some examples, in addition to identifying a value within an entry as an indicator of a network compromise, the event classifier 206 may be configured to determine a retention period for a corresponding plurality of entries based at least in part on the classification of the network event.

The analysis engine may further include an event filter 208 coupled to the event classifier 206 and configured to filter the plurality of entries within the traffic logs and only send entries classified as potentially compromising networking events to a pattern recognizer 210 and/or recurrence detector 212 of the analysis engine 110 for further analysis. The pattern recognizer may be configured to receive the potentially compromising plurality of entries from the event filter, and analyze the entries to determine one or more patterns of occurrence that may span a predetermined period of time. The recurrence detector may be configured to receive a plurality of entries having identified patterns therein, and analyze the entries to detect one or more patterns of recurrence that may span a predetermined period of time.

Examples of suitable occurrence patterns and/or recurrence patterns may be or include the first observed instance of a new value within a field (e.g., domain name, IP address, email address, file hash, and the like), a rare observed instance of a value within a field (e.g., value has not been observed within weeks or months), high dataflow internal and/or external to the network that may indicate the occurrence of an internal or external entity respectively uploading or downloading various proprietary data, an email including a suspicious link or attachment, an email or source email IP address in which components of the email headers have been deemed forgeries, previously unobserved behavior from internal servers (e.g., sending information to an Internet source), established web traffic domains leading to new IP addresses which may indicate a compromised domain name system (DNS), a user or account exceeding land speed laws (e.g., the utilization of a Chinese IP address followed by a US IP within short amount of time) that may indicate a compromised account, a user account having multiple failed login attempts in a short period of time that may indicate an attempt to crack a password, or external intrusion prevention systems scanning a multitude of website resources that may indicate an attempt to discover network vulnerabilities.

In some examples, the pattern recognizer 210 and recurrence detector 212 may be configured to provide feedback to the event classifier 206 for classifying the plurality of entries as potentially compromising or non-compromising network events. As such, the event classifier may be configured to classify entries based at least in part on information received from one or more of the table 108, indicator database 204, pattern recognizer 210 and/or recurrence detector 212.

The intrusion detector 112 may be configured to search the corresponding plurality of entries archived by the data collector 104, and from the search, retrieve any entry of the corresponding plurality of entries having a value associated with an identified network compromise. In some examples, the intrusion detector may be operatively coupled to the event classifier 206 of the analysis engine 110, and configured to receive entries classified as potentially compromising networking events. In these examples, the intrusion detector may be configured to automatically notify a network operator of the potentially compromising event and activate one or more network threat containment systems for mitigating a potentially compromising or compromising event.

Figure 3:
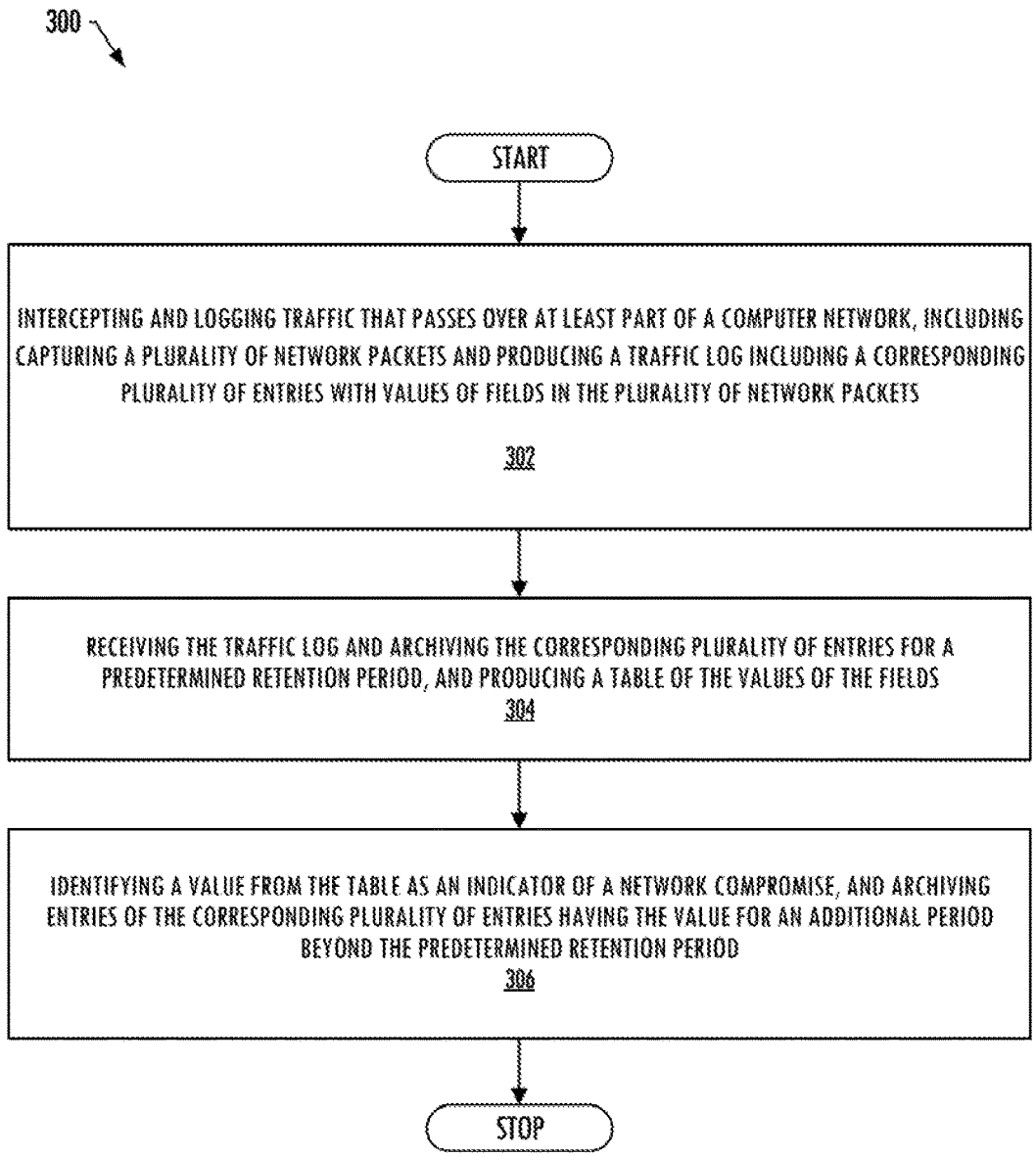
FIG. 3 is a flow diagram illustrating various operations of a method for selective extended archiving of data, according to example implementations of the present disclosure.

FIG. 3 illustrates a flowchart including various operations of a method 300 for selective extended archiving of data, in accordance with an example implementation of the present disclosure. As shown at block 302, the method may include intercepting and logging traffic that passes over at least part of a computer network. Intercepting and logging traffic may include capturing a plurality of network packets and producing a traffic log including a corresponding plurality of entries with values of fields in the plurality of network packets. The method may also include receiving the traffic log and archiving the corresponding plurality of entries for a predetermined retention period, and producing a table of the values of the fields, as shown at block 304. The method may also include identifying a value from the table as an indicator of a network compromise, and archiving entries of the corresponding plurality of entries having the value for an additional period beyond the predetermined retention period, as shown in block 306.

According to example implementations of the present disclosure, the system 100 and its subsystems and/or components including the network analyzer 102, data collector 104, archive 106, table 108, analysis engine 110, and/or intrusion detector 112 and the subcomponents thereof may be implemented by various means. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems, tools and respective elements shown and described herein. In examples involving more than one apparatus, the respective apparatuses may be connected to or otherwise in communication with one another in a number of different manners, such as directly or indirectly via a wired or wireless network or the like.

Figure 4:
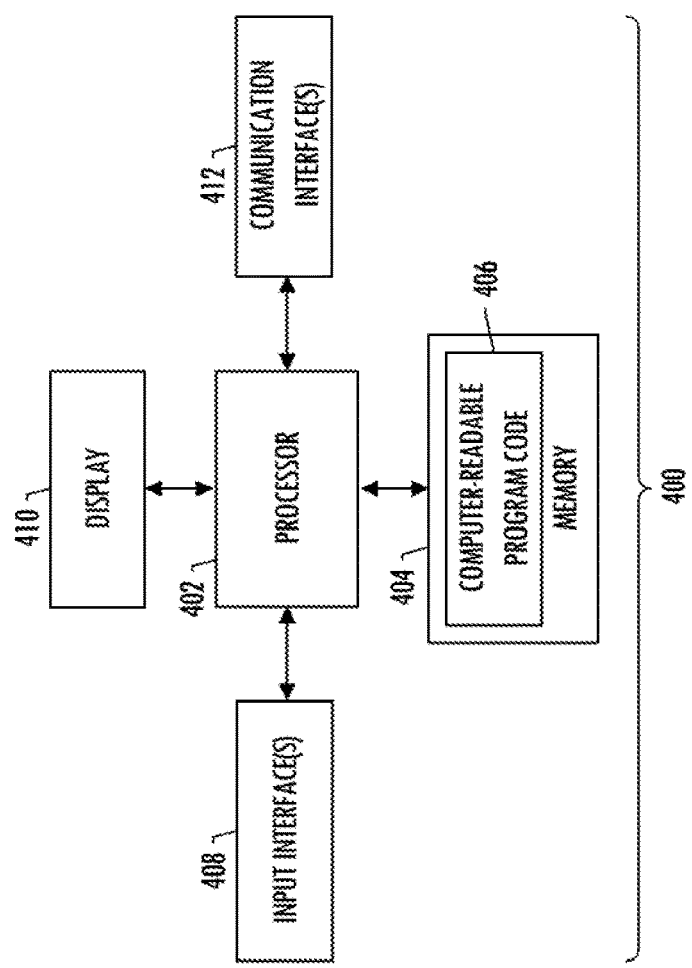
FIG. 4 illustrates an apparatus according to example implementations of the present disclosure.

FIG. 4 illustrates an apparatus 400 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 402 (e.g., processor unit) connected to a memory 404 (e.g., storage device).

The processor 402 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 404 (of the same or another apparatus).

The processor 402 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 404 is generally any piece of computer hardware that is capable of storing information such as, for example, data (e.g., archive 106, table 108), computer programs such as computer-readable program code 406, and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include one or more input interfaces 408 (e.g., user input interfaces), a display 410, and/or communications interface 412 (e.g., communications unit). The input interfaces 408 may be wired or wireless, and may be configured to receive information from a user into the apparatus, such as for processing, storage and/or display. Suitable examples of input interfaces include a microphone, image or video capture device, keyboard or keypad, joystick, touch-sensitive surface (separate from or integrated into a touchscreen), biometric sensor or the like. The input interfaces may further include one or more interfaces for communicating with peripherals such as printers, scanners or the like.

The display 410 may be configured to present or otherwise display information to a user, suitable examples of which include a liquid crystal display (LCD), light-emitting diode display (LED), plasma display panel (PDP) or the like. The communications interface 412 may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 400 may include a processor 402 and a computer-readable storage medium or memory 404 coupled to the processor, where the processor is configured to execute computer-readable program code 406 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for selective extended archiving of data, the apparatus comprising a processor and a memory storing executable instructions that, in response to execution by the processor, cause the apparatus to at least:

intercept and log traffic that passes over at least part of a computer network, including being caused to capture a plurality of network packets and produce a traffic log file including a corresponding plurality of entries with values of fields in the plurality of network packets;

archive the corresponding plurality of entries of the traffic log file for a predetermined retention period, and produce a table of the values of the fields; and identify a value from the table as an indicator of a network compromise, and archive entries of the corresponding plurality of entries having the value for an additional period beyond the predetermined retention period;

wherein the apparatus being caused to produce the table includes being caused to produce the table including a record for each value of the values of the fields, the record including at least one of a time at or date on which an entry with the value is first or most recently included in the traffic log, or a number of entries with the value in the traffic log; and wherein the apparatus being caused to identify the value includes being caused to identify the value as a first or irregular instance of the value in the table based on an iterative comparison of values in the table.

2. The apparatus of claim 1, wherein the apparatus being caused to produce the traffic log file includes being caused to produce the traffic log file including the corresponding plurality of entries with values of fields including at least one of an Internet Protocol (IP) address, domain name, email address, user agent, or hash function field on which the indicator of the network compromise is identified.

3. The apparatus of claim 1, wherein the traffic log file includes a plurality of traffic log files produced over successive time frames, and the apparatus being caused to produce the table includes being caused to iteratively update the table to include the values of the fields of the corresponding plurality of entries as the plurality of traffic log files are produced.

4. The apparatus of claim 1, wherein the memory stores executable instructions that, in response to execution by the processor, cause the apparatus to further search the corresponding plurality of archived entries, and from the search, retrieve any entry of the corresponding plurality of archived entries having a value associated with an identified network compromise.

5. A method for selective extended archiving of data, the method comprising:
   intercepting and logging traffic that passes over at least part of a computer network, including capturing a plurality of network packets and producing a traffic log file including a corresponding plurality of entries with values of fields in the plurality of network packets;
   archiving the corresponding plurality of entries of the traffic log file for a predetermined retention period, and producing a table of the values of the fields; and
   identifying a value from the table as an indicator of a network compromise, and archiving entries of the corresponding plurality of entries having the value for an additional period beyond the predetermined retention period;
   wherein producing the table includes producing the table including a record for each value of the values of the fields, the record including at least one of a time at or date on which an entry with the value is first or most recently included in the traffic log, or a number of entries with the value in the traffic log; and
   wherein identifying the value includes identifying the value as a first or irregular instance of the value in the table based on an iterative comparison of values in the table.

6. The method of claim 5, wherein producing the traffic log file includes producing the traffic log file including the corresponding plurality of entries with values of fields including at least one of an Internet Protocol (IP) address, domain name, email address, user agent, or hash function field on which the indicator of the network compromise is identified.

7. The method of claim 5, wherein the traffic log file includes a plurality of traffic log files produced over successive time frames, and producing the table includes iteratively updating the table to include the values of the fields of the corresponding plurality of entries as the plurality of traffic log files are produced.

8. The method of claim 5, further comprising searching the corresponding plurality of archived entries, and from the search, retrieving any entry of the corresponding plurality of archived entries having a value associated with an identified network compromise.

9. A computer-readable storage medium for selective extended archiving of data, the computer-readable storage medium being non-transitory and having computer-readable program code stored therein that, in response to execution by a processor, cause an apparatus to at least:
   intercept and log traffic that passes over at least part of a computer network, including being caused to capture a plurality of network packets and produce a traffic log file including a corresponding plurality of entries with values of fields in the plurality of network packets;
   archive the corresponding plurality of entries of the traffic log file for a predetermined retention period, and produce a table of the values of the fields; and
   identify a value from the table as an indicator of a network compromise, and archive entries of the corresponding plurality of entries having the value for an additional period beyond the predetermined retention period;
   wherein the apparatus being caused to produce the table includes being caused to produce the table including a record for each value of the values of the fields, the record including at least one of a time at or date on which an entry with the value is first or most recently included in the traffic log, or a number of entries with the value in the traffic log; and
   wherein the apparatus being caused to identify the value includes being caused to identify the value as a first or irregular instance of the value in the table based on an iterative comparison of values in the table.

10. The computer readable storage medium of claim 9, wherein the apparatus being caused to produce the traffic log file includes being caused to produce the traffic log file including the corresponding plurality of entries with values of fields including at least one of an Internet Protocol (IP) address, domain name, email address, user agent, or hash function field on which the indicator of the network compromise is identified.

11. The computer readable storage medium of claim 9, wherein the traffic log file includes a plurality of traffic log files produced over successive time frames, and the apparatus being caused to produce the table includes being caused to iteratively update the table to include the values of the fields of the corresponding plurality of entries as the plurality of traffic log files are produced.

12. The computer readable storage medium of claim 9, having further computer-readable program code portions stored therein that in response to execution by the processor, cause the apparatus to at least search the corresponding plurality of archived entries, and from the search, retrieve any entry of the corresponding plurality of archived entries having a value associated with an identified network compromise.

* * * * *